(12) United States Patent
Jin (10) Patent No.: US 7,778,317 B2
(45) Date of Patent: Aug. 17, 2010

(54) METHOD AND DEVICE FOR DETECTING INDUCTIVE ELEMENTS IN A COMMUNICATION LINE

(75) Inventor: Zhaoguo Jin, Guangdong (CN)

(73) Assignee: Huawei Technologies Co., Ltd., Guangdong P.R. (CN)

( * ) Notice: Subject to any disclaimer, the term of this patent is extended or adjusted under 35 U.S.C. 154(b) by 753 days.

(21) Appl. No.: 11/727,233

(22) Filed: Mar. 26, 2007

(65) Prior Publication Data

US 2007/0206668 A1   Sep. 6, 2007

Related U.S. Application Data

(63) Continuation of application No. PCT/CN2006/001674, filed on Jul. 14, 2006.

(30) Foreign Application Priority Data

Jul. 15, 2005 (CN) .................. 2005 1 0036052

(51) Int. Cl.
  H04B 3/46 (2006.01)
  H04B 17/00 (2006.01)
  H04Q 1/20 (2006.01)
(52) U.S. Cl. .................. 375/224; 375/222; 307/98; 326/30; 379/394; 379/398; 333/263; 324/645
(58) Field of Classification Search .................. 375/222, 375/224; 307/98; 326/30; 379/394, 398; 333/263; 324/645
See application file for complete search history.

(56) References Cited

U.S. PATENT DOCUMENTS

| 4,307,267 | A |   | 12/1981 | Peoples |  |
| 4,825,459 | A | * | 4/1989 | Farrow et al. | 379/3 |
| 5,881,130 | A | * | 3/1999 | Zhang | 379/27.08 |
| 6,263,047 | B1 | * | 7/2001 | Randle et al. | 379/31 |
| 6,819,744 | B1 | * | 11/2004 | Banwell et al. | 379/1.01 |
| 6,959,037 | B2 | * | 10/2005 | Bailey et al. | 375/224 |
| 2002/0169585 | A1 | * | 11/2002 | Jones et al. | 702/189 |
| 2003/0138082 | A1 | * | 7/2003 | Lari et al. | 379/93.01 |
| 2004/0140921 | A1 | * | 7/2004 | Sivard | 341/122 |

FOREIGN PATENT DOCUMENTS

| JP | 02226819 A | 9/1990 |
| JP | 2001044898 A | 2/2001 |
| JP | 2003224498 A | 8/2003 |
| JP | 2005520461 T | 7/2005 |
| WO | WO 2004/099711 | 11/2004 |

* cited by examiner

*Primary Examiner*—Mohammad H Ghayour
*Assistant Examiner*—Sung Ahn (57) ABSTRACT

A method for detecting inductive elements in a communication line, including the processes of: inputting a detecting signal to an end of the communication line; sampling the time domain voltage vector of one end of the communication line; generating the amplitude-frequency characteristic curve of the differential input impedance of one end of the communication line according to the time domain voltage vector; determining the number of the inductive elements in the communication line according to the number of the apexes or zeros on the curve. The present invention also discloses a device for detecting inductive elements in a communication line. By the present invention, the automatic detections of the number of inductive elements such as load coils or phone splitters in the communication line are implemented with the exact detection and the high efficiency, thereby lowering the cost of detecting failures of communication line.

17 Claims, 5 Drawing Sheets

METHOD AND DEVICE FOR DETECTING INDUCTIVE ELEMENTS IN A COMMUNICATION LINE

CROSS-REFERENCE TO RELATED APPLICATIONS

This is a continuation of International Application No. PCT/CN2006/001674, filed on Jul. 14, 2006, which designated the United States; which claims priority of Chinese Patent Application No. 200510036052.5, filed Jul. 15, 2005, the disclosure of each application is hereby incorporated by reference in its entirety.

FIELD OF THE TECHNOLOGY

The present invention relates to the communication field, more particularly to a method and device for detecting inductive elements such as a load coil or phone splitter in a communication line.

BACKGROUND OF THE INVENTION

In the telecommunication field, an operator provides subscribers with broadband telecommunication services and narrowband telecommunication services at the same time through the local telephone electric cable, usually the twisted pair. For example, the Asymmetric Digital Subscriber Line over the Plain Old Telephone Service (ADSL over POTS), the ADSL over the ISDN, the Very high bit-rate DSL over the POTS (VDSL over POTS), and the VDSL over the ISDN. These applications are very universal, and the xDSL is the joint name of the ADSL and the VDSL.

Figure 1:
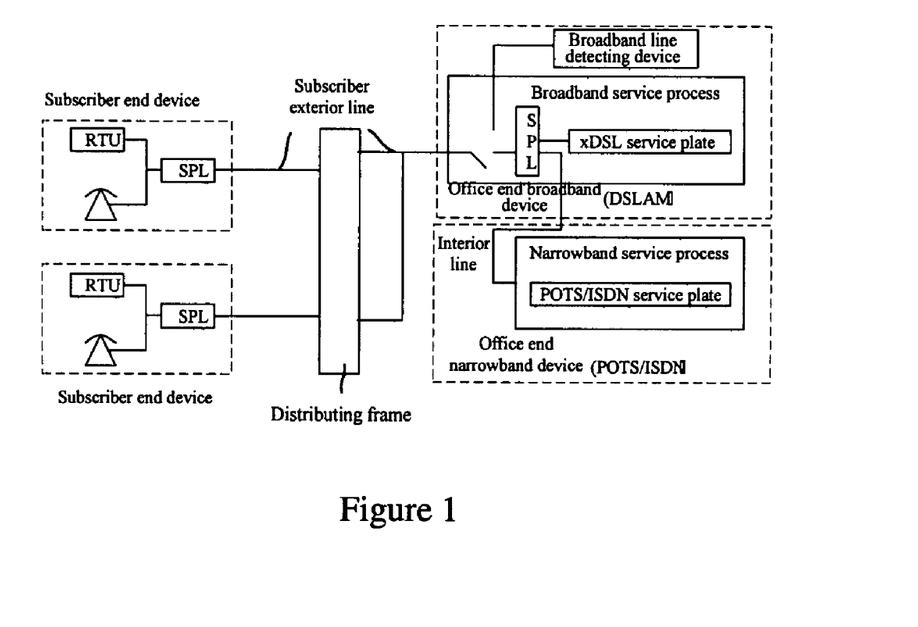
FIG. 1 is a schematic diagram illustrating the environment of the failure detecting system of the subscriber communication line.

As shown in FIG. 1, the xDSL signal and the POTS/ISDN signal coexist in one subscriber line. In the office end, the voice Splitter (SPL) in the broadband access device Data Subscriber Line Access Multiplexer (DSLAM) is adopted to differentiate the broadband services from the narrowband services, and send them to the broadband service panel (namely, xDSL service panel) and the narrowband service panel (namely, POTS/ISDN service panel) to be processed respectively. In the subscriber end, the Splitter (SPL) sends the separated broadband service and narrowband service to the Remote Terminal Unit (RTU) and the telephone. During the process of service operation and maintenance, it is usually necessary to take various measurements of the subscriber communication line to detect the quality and failure of the communication line. The broadband communication line detecting device in FIG. 1 is a device for implementing various testing functions.

To improve the quality of the voice signal transmission, at least one coil is usually connected in series to the communication line; however, when the xDSL service is put into operation, the existence of the coil will impact the operation of the xDSL service. Therefore, the coil needs to be removed from the communication line to support the operation of the xDSL service. Accordingly, how to decide whether there is a load coil on a certain communication line is very important for an operator to implement the intelligent maintenance on the communication line. At the same time, when detecting the failure, the office end usually needs to know whether the SPL in the office end or the subscriber end have been mounted correctly. How to decide whether the SPL has been mounted correctly is also a key for implementing the intelligent maintenance on the communication line.

SUMMARY OF THE INVENTION

The present invention provides a method and device for detecting inductive elements in a communication line, detecting whether there is an inductive element such as a load coil or phone splitter in the communication line.

A method for detecting inductive elements in a communication line comprises:

inputting a detecting signal to an end of the communication line;

sampling a time domain voltage vector of one end of the communication line;

generating an amplitude-frequency characteristic curve of a differential input impedance of one end of the communication line according to the time domain voltage vector;

determining the number of the inductive elements in the communication line according to the number of the apexes or zeros on the curve.

A device for detecting inductive elements in a communication line comprises:

a signal generating unit, for generating a detecting signal used for detecting the inductive elements in the communication line;

a line interface unit connected to the signal generating unit, for inputting the detecting signal into an end of the communication line;

a data sampling unit connected to the line interface unit, for sampling a time domain voltage vector of one end of the communication line;

a digital signal processor connected to the data sampling unit, for generating an amplitude-frequency characteristic curve of a differential input impedance of one end of the communication line according to the time domain voltage vector; and determining the number of the inductive elements in the communication line according to the number of the apexes or zeros on the curve.

It can be seen from the above-mentioned solution that, the detecting signal is inputted into one end of the communication line; the time domain voltage vector of the detecting signal inputted end is sampled; the amplitude-frequency characteristic curve of the differential input impedance on the communication line is generated according to the time domain voltage vector; the number of the inductive elements in the communication line is determined according to the number of the apexes or zeros on the amplitude-frequency characteristic curve of the differential input impedance. Accordingly, the automatic detections of the number of the inductive elements such as the load coil or the phone splitter in the communication line are implemented with the accurate judgment and the high efficiency so as to lower the cost of detecting the failure of the communication line.

DETAILED DESCRIPTION OF THE INVENTION

The present invention is hereinafter further described in detail with reference to the accompanying drawings and embodiments. It should be noted that the specific embodiments described here are only used for explaining the present invention and not used for limiting the protection scope of the present invention.

Since the load coil or phone splitter are equivalent to the differential mode inductance coil, in the embodiments of the present invention, the automatic detection of the load coil or phone splitter in the communication line is implemented according to the resonance principle of the capacitances and inductances.

Figure 2:
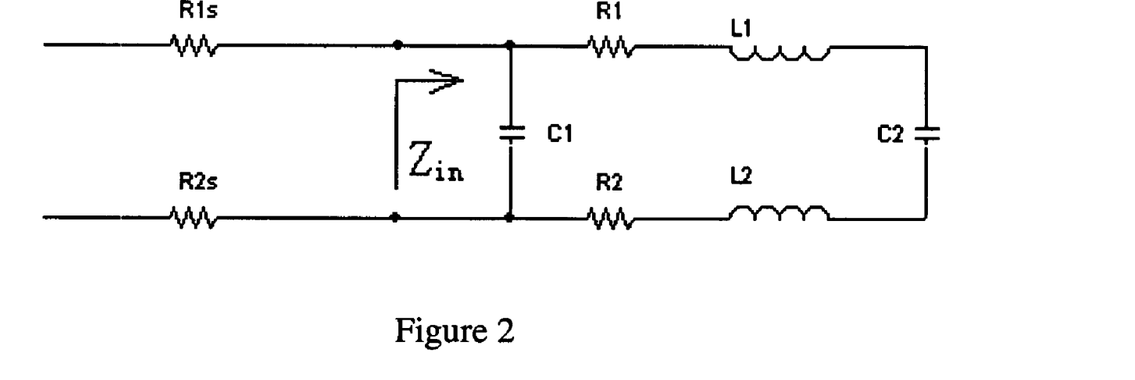
FIG. 2 shows a circuit model of a communication line with one coil.

In the case that there is one coil in the communication line, as shown in FIG. 2, L1 and L2 in this figure represent one load coil or phone splitter in the communication line. For the deferential input impedance $Z_{in}$ marked by the arrow in this figure, the transfer function $Z_{in}$ of frequency domain obtained through deduction is as follows:

$$Z_{in(s)} = \frac{V_1 - V_2}{\frac{V_a - V_1}{R_{1s}}} = \frac{(L_1 + L_2)C_2 s^2 + (R_1 + R_2)C_2 s + 1}{s((L_1 + L_2)C_1 C_2 s^2 + (R_1 + R_2)C_1 C_2 s + C_1 + C_2)};$$

the apex of this transfer function in the positive frequency domain is as follows:

$$f_p = \frac{1}{2\pi}\sqrt{\frac{C_1 + C_2}{(L_1 + L_2)C_1 C_2}}.$$

Figure 3:
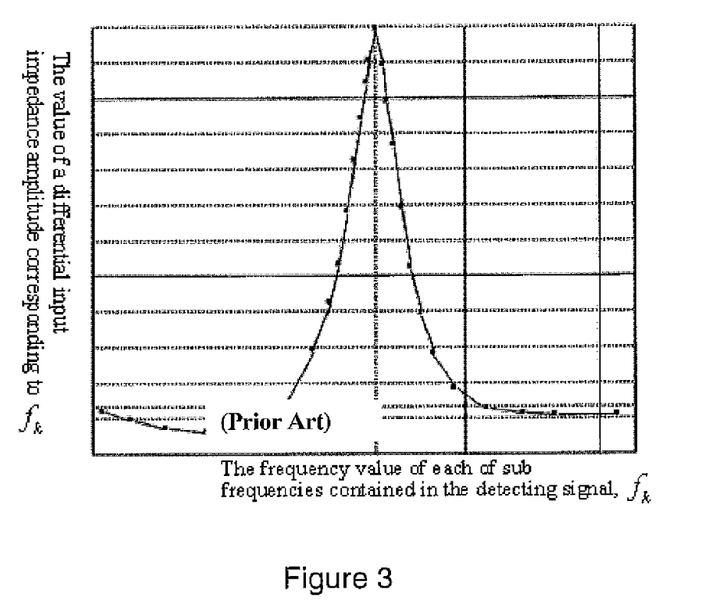
FIG. 3 shows an amplitude-frequency characteristic curve of transfer function is of the differential input impedance of a communication line with one coil.

The amplitude-frequency characteristic curve of the above-mentioned transfer function is shown as FIG. 3. It can be seen from the curve that, if there is one coil in the communication line, there will be one apex (wave crest) on the amplitude-frequency characteristic curve of the transfer function of the differential input impedance of the communication line.

Figure 4:
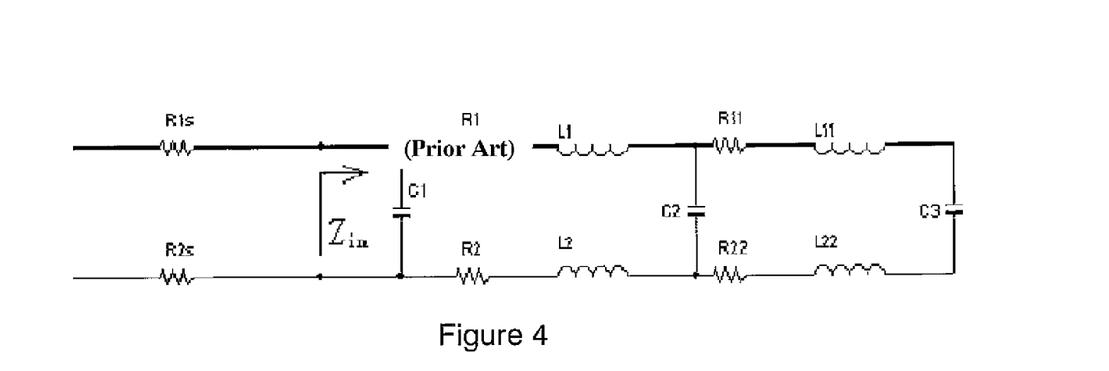
FIG. 4 shows a circuit model of a communication line with two coils.

In the case that there are two coils in the communication line, as shown in FIG. 4, the circuit model of the communication line is as follows:

$$Z_{in(s)} = \frac{V_1 - V_2}{\frac{V_a - V_1}{R_{1s}}} = \frac{m_4 s^4 + m_3 s^3 + m_2 s^2 + m_1 s + 1}{s(n_4 s^4 + n_3 s^3 + n_2 s^2 + n_1 s + n_o)},$$

wherein, m and n are the constants related to the basic parameters of the communication line.

This transfer function has two apexes in the positive frequency field, which are respectively:

$$f_{p1} = \frac{1}{2\pi}\sqrt{\frac{R_a C_1 C_3 + R_a C_2 C_3 + R_b C_1 C_2 + R_b C_1 C_3}{L_a R_b C_1 C_2 C_3 + R_a L_b C_1 C_2 C_3}},$$

$$f_{p2} = \frac{1}{2\pi}\sqrt{\frac{n_2 + \sqrt{n_2^2 - 4n_4 n_o}}{2n_4}}.$$

Figure 5:
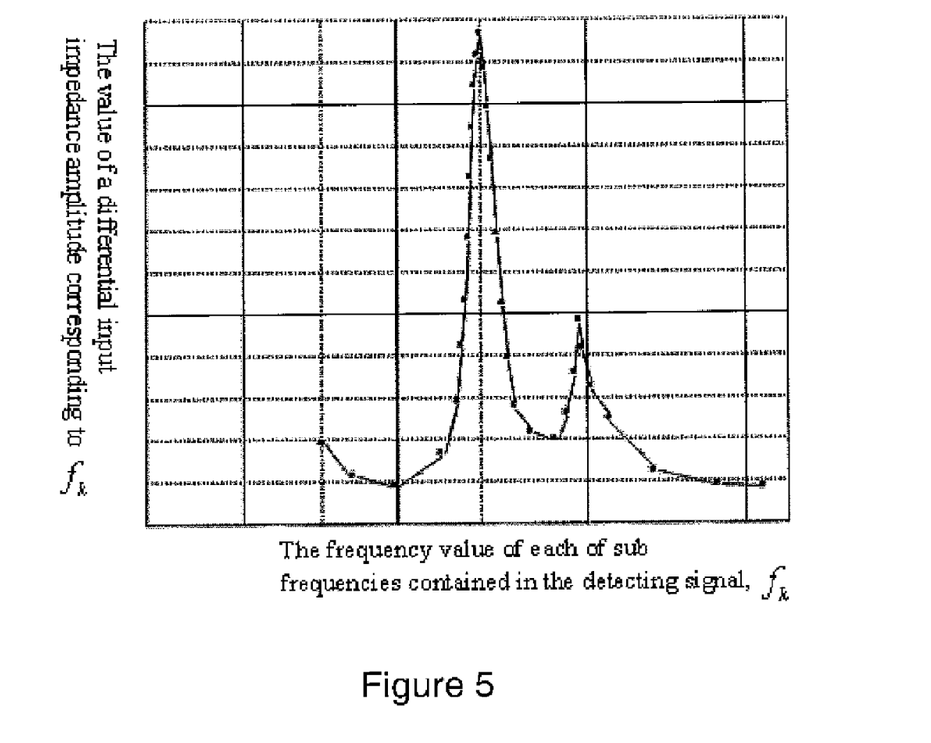
FIG. 5 shows an amplitude-frequency characteristic curve of the transfer function of the differential input impedance of a communication line with two coils.

As can be seen from the amplitude-frequency characteristic curve of the transfer function of the differential input impedance, as shown in FIG. 5, if there are two coils in the communication line, there will be two apexes on the amplitude-frequency characteristic curve of the transfer function of the differential input impedance of the communication line.

According to the characteristic analyses of the transfer function of the differential input impedance of the communication line when there are one or two coils in the communication line, it can be deduced that, if there are N coils in the communication line, the transfer function is as follows:

$$Z_{in(s)\_N} = \frac{m_{2N} s^{2N} + m_{2N-1} s^{2N-1} + \cdots + m_1 s + 1}{s(n_{2N} s^{2N} + n_{2N-1} s^{2N-1} + \cdots + n_1 s + n_o)},$$

wherein, $m_j$, $n_j$ (j=0, 1 ... 2N−1, 2N) are the constants related to the basic parameters of the communication line. If there are N+1 coils in the communication line, the transfer function is obtained from the satisfied relation between the corresponding circuit models with N coils and N+1 coils, which is as follows:

$$Z_{in(s)\_N+1} = \frac{[Z_{in(s)\_N} + R_{N+1} + R_{N+2} + s(L_{N+1} + L_{N+2})]\frac{1}{sC_{N+1}}}{[Z_{in(s)\_N} + R_{N+1} + R_{N+2} + s(L_{N+1} + L_{N+2})] + \frac{1}{sC_{N+1}}};$$

Through simplifying the above formula, the transfer function can be obtained, which is as follows:

$$Z_{in(s)\_N+1} = \frac{m'_{2(N+1)} s^{2(N+1)} + m'_{2N+1} s^{2N+1} + \cdots + m'_1 s + 1}{s(n'_{2(N+1)} s^{2(N+1)} + n'_{2N+1} s^{2N+1} + \cdots + n'_1 s + n'_o)},$$

Wherein, $m'_j$, $n'_j$ (j=0, 1 ... 2N+1, 2N+2) are the constants related to the basic parameters of the communication line. This formula indicates that the number of coils in the communication line equals to the number of the apexes on the frequency characteristic curve of the transfer function of the differential input impedance.

Obviously, the present invention also includes a scheme of determining whether there are coils or the number of the coils based on the number of the zeros (trough) of the frequency characteristic curve of the transfer function of the differential input impedance, or based on the number of the apexes or zeros on the frequency characteristic curve of the imaginary part of the differential input impedance.

In an embodiment of the present invention, the special case that a coil is in the beginning end of the communication line will be considered. If there is a coil connected to the beginning end of communication line, for example the phone splitter in the office end. In this case, $C_1=0$ in all the above models. When $C_1=0$ is substituted in the apex frequency of the transfer function of the differential input impedance, it can be found that there must be one apex frequency trending to the infinite, whereas it can not be implemented with hardware. In other words, in the finite frequency domain, the number of apexes on the frequency characteristic curve of the transfer function of the differential input impedance of the communication line is one less than the number of coils in the communication line.

For example, in the case that there is one coil in the communication line, $$f_p = \frac{1}{2\pi}\sqrt{\frac{C_1+C_2}{(L_1+L_2)C_1C_2}}, \text{ if } C_1 = 0, f_p = \infty.$$

For another example, in the case that there are two coils in the communication line, it can be obtained as follows:

$$f_{p1} = \frac{1}{2\pi}\sqrt{\frac{R_aC_1C_3 + R_aC_2C_3 + R_bC_1C_2 + R_bC_1C_3}{L_aR_bC_1C_2C_3 + R_aL_bC_1C_2C_3}},$$

$$f_{p2} = \frac{1}{2\pi}\sqrt{\frac{n_2 + \sqrt{n_2^2 - 4n_4n_o}}{2n_4}};$$

if $C_1=0$, $f_{p1}=\infty$, whereas $f_{p2}$ is a finite value.

To detect the coils in the beginning end of the communication line, which is a special case, an interline capacitance will be added to the beginning end of the communication line. In this way, wherever the coil lies in the communication line, the number of apexes on the amplitude-frequency characteristic curve of the transfer function of the differential input impedance of the communication line is exactly the number of coils in the communication line.

Figure 6:
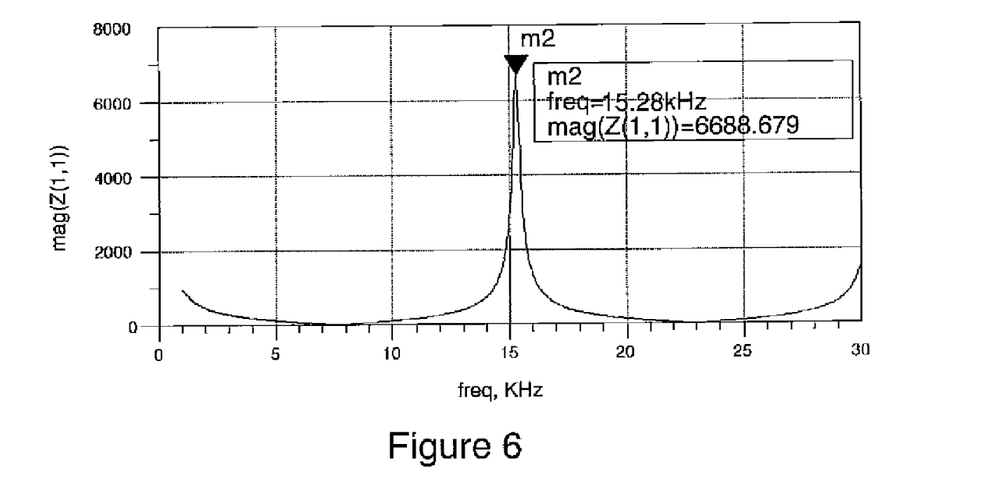
FIG. 6 shows an amplitude-frequency characteristic curve of transfer function of the differential input impedance of a communication line in which an inherent resonance exists.

In another embodiment, the influence of the communication line's inherent resonance on the detection is considered. Since the communication line is generally long, the above-mentioned circuit models can not be used for representing the transmission characteristic of signal when the frequency is relatively high, and it is necessary to use the transmission line model for representing the transmission characteristic of signal of the communication line. According to the transmission line theory, in the case that terminals do not match, there will be resonance occurred on the frequency characteristic curve of the transfer function of the differential input impedance in itself even if no coil is added to the communication line, and the resonance frequency is related to the length of the communication line. For example, for the transmission line with an open circuit in the terminal, if the length of the communication line is half of the signal wave length, there will be an apex of the amplitude-frequency characteristic curve of the transfer function of the differential input impedance of the communication line. FIG. 6 shows the inherent resonance of is the communication line with 6 kilometers length and with an open circuit in the terminal. As shown in FIG. 6, when the frequency is about 15.3 KHz, an apex appears on the amplitude-frequency characteristic curve of the differential input impedance of the communication line. For the common twisted pair with polyvinyl chloride insulation, the peak value of inherent resonance frequency is about:

$$f_c = \frac{0.3c}{\ell},$$

where, c is the light velocity in vacuum, l is the length of the communication line.

To avoid that the peak value of inherent resonance frequency of the communication line influences the detection, the frequency of the detecting signal is limited so that the highest frequency of the detecting signal is not higher than the peak value of the inherent resonance frequency in the communication line.

Figure 7:
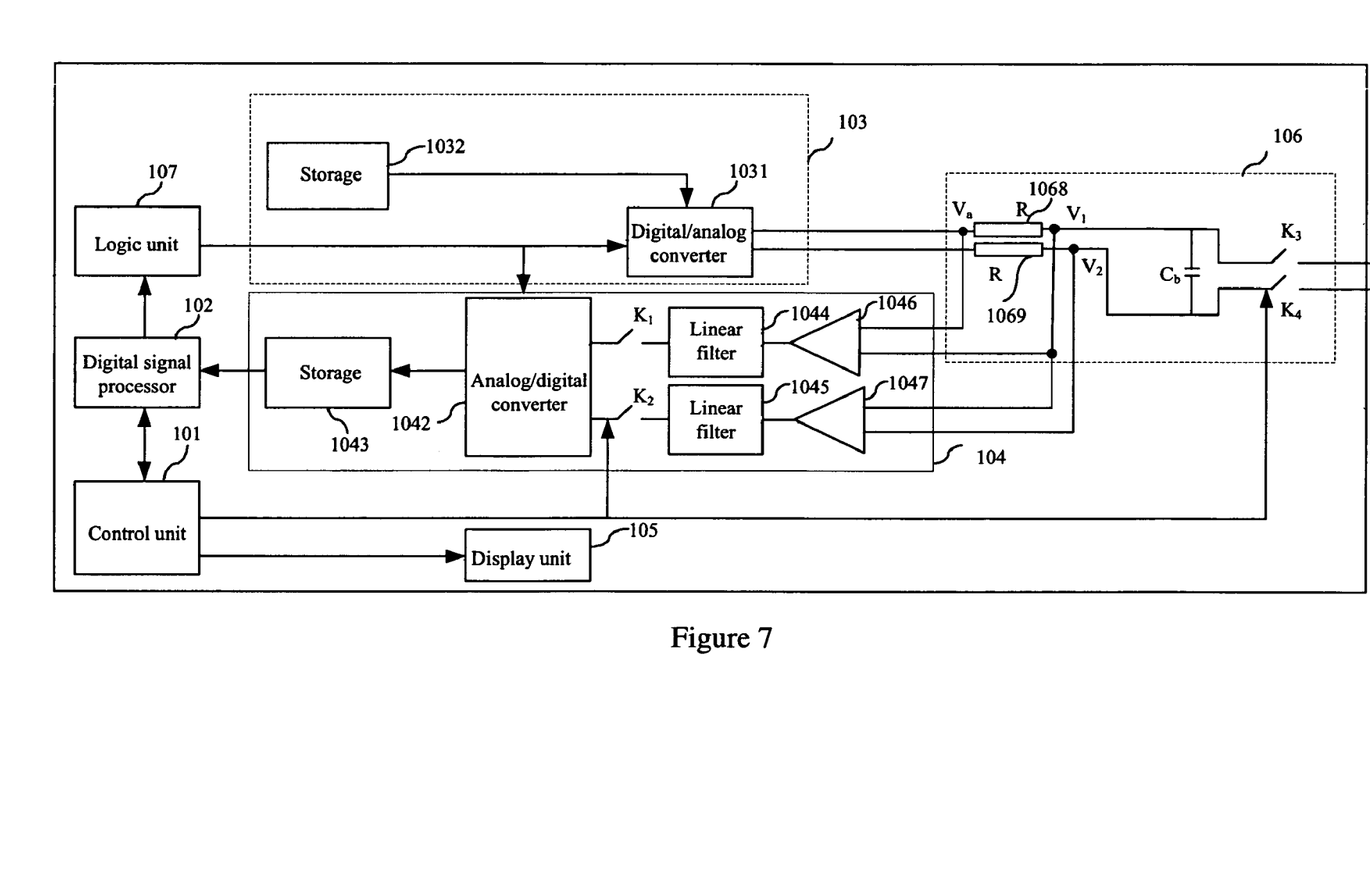
FIG. 7 shows a structure of a device for detecting inductive elements in the communication line in accordance with an embodiment of the present invention.

FIG. 7 shows the structure of the broadband communication line detecting device 100 for automatically detecting load coil in the broadband communication line in accordance with an embodiment of the present invention.

The broadband communication line detecting device 100 includes a control unit 101, a digital signal processor 102, a signal generating unit 103, a data sampling unit 104, a display unit 105, a line interface unit 106 and a logical unit 107.

The control unit 101, a Central Processing Unit (CPU) in physics, performs a centralized control to the detecting device 100, and communicates with the digital signal processor 102 through the Host Port Interface (HPI). The control unit 101 can access the storage space of the digital signal processor 102 directly.

The digital signal processor 102 performs the computations of the signal inputted by the data sampling unit 104 to generate the amplitude-frequency characteristic curve of the differential input impedance. The digital signal process 102 determines the number of apexes or zeros on the curve, and reports the result to the control unit 101. The control unit 101 will output the result to the display unit 105 for displaying.

The signal generating unit 103 generates the special signal used for detection. The digital input bus of the digital/analog converter 1031 is connected to the data bus of the storage 1032, and the storage 1032 stores the detecting signal set by the control unit 101. Since the frequency domain curve needs to be depicted, the detecting signal needs having a certain bandwidth, whereas the signal with continuous bandwidth is difficult to be implemented. In view of the cost, the detecting signal should be a set of disperse frequency point signals within a required bandwidth, which is implemented through sending the sinusoidal modulated signal or the pulse signal. The digital/analog converter unit 1031 reads the detecting signal in the storage 1032, and sends the detecting signal to the communication line through the line interface unit 106.

In the line interface unit 106, R1068 and R1069 are current detecting resistances. One end of R1068 and one end of R1069 are connected to the analog output of the digital/analog converter unit 1031, and the other end of R1068 and the other end of R1069 are connected to the exterior line through the relay switch $K_3$ and $K_4$ respectively, wherein the relay switches $K_3$ and $K_4$ comprise a relay switch group. The interline capacitance $C_b$, in parallel with the relay switch $K_3$ and $K_4$, will connect to the beginning end of the communication line, so as to solve the problem that the number of apexes on the amplitude-frequency characteristic curve of the differential input impedance is one less than the number of coils when the coil locates at the beginning end of the communication line.

The data sampling unit 104 detects the time domain voltage vector $V_1-V_2$ and $V_a-V_1$ of the line sampling nodes $V_a, V_1, V_2$, and sends them to the digital signal processor 102 to be processed. The analog/digital converter 1042 accesses the storage 1043 through a data bus, an address bus and a control bus. The analog input of the analog/digital converter 1042 is connected to the three sampling nodes $V_a, V_1, V_2$ through the linear filters 1044, 1045 and the differential operational amplifiers 1046, 1047.

According to the circuit diagram as shown in FIG. 7, the transfer function of the differential input impedance of the communication line can be obtained as follows:

$$Z_{in} = \frac{V_1 - V_2}{\frac{V_a - V_1}{R}} = R\frac{1 - \frac{V_2}{V_1}}{\frac{V_a}{V_1} - 1} = R\frac{V_1 - V_2}{V_a - V_1};$$

the amplitude-frequency characteristic thereof is:

$$|Z_{in}| = R\left|\frac{V_1 - V_2}{V_a - V_1}\right|;$$

and $$V_{12} = V_1 - V_2;$$
$$V_{a1} = V_a - V_1.$$

Accordingly, the sampling frequency used for sampling the time domain voltage vector, namely the sampling times within the unit time, and the sampling point number are $f_s$, N respectively. At the same time, after the sequence values of $V_{a1}, V_{12}$ have been obtained through sampling, a Fast Fourier Transform (FFT) will be performed to the $V_{a1}, V_{12}$, and the transformed sequences are expressed as $V_{a1k}, V_{12k}$ (k= 0, 1 ... N−2, N−1).

Supposing that the transmitted signal contains M frequencies, which are expressed as $f_1, f_2 ... f_{M-1}, f_M$ respectively, and the corresponding subset of the signals with these frequencies can be found in the sequence $V_{a1k}, V_{12k}$ and a new sequence $V'_{a1k}, V'_{12k}$ (k=0, 1 ... M−1) will be obtained. The relation between the new M point sequences $V'_{a1k}, V'_{12k}$ (k=0, 1 ... M−1) and the previous M point sequences $V_{a1k}, V_{12k}$ (k= 0, 1 ... N−2, N−1) is:

$$\begin{cases} V'_{a1k} = V_{a1j}(k = 0, 1 ... M-1; \quad j = \frac{f_k}{f_s}N) \\ V'_{12k} = V_{12j}(k = 0, 1 ... M-1; \quad j = \frac{f_k}{f_s}N) \end{cases};$$

wherein, M is the number of the sub frequencies contained in the detecting signal, $f_k$ is the frequency value of each frequency component contained in the transmitted detecting signal.

The amplitude of each element of the new sequence, after being computed, is divided by the elements in the corresponding position of $V'_{12k}$ and $V'_{a1k}$ (k=0, 1 ... M−1), and then multiplied by R, so as to obtain a differential input impedance amplitude corresponding to the M frequency signals $f_1, f_2 ... f_{M-1}, f_M$. These frequency points and the corresponding differential input impedance amplitudes are: depicted to form the needed amplitude-frequency characteristic curve of the differential input impedance, and whether there are coils in the communication line or the number of coils can be determined according to the number of apexes in this curve.

Figure 8:
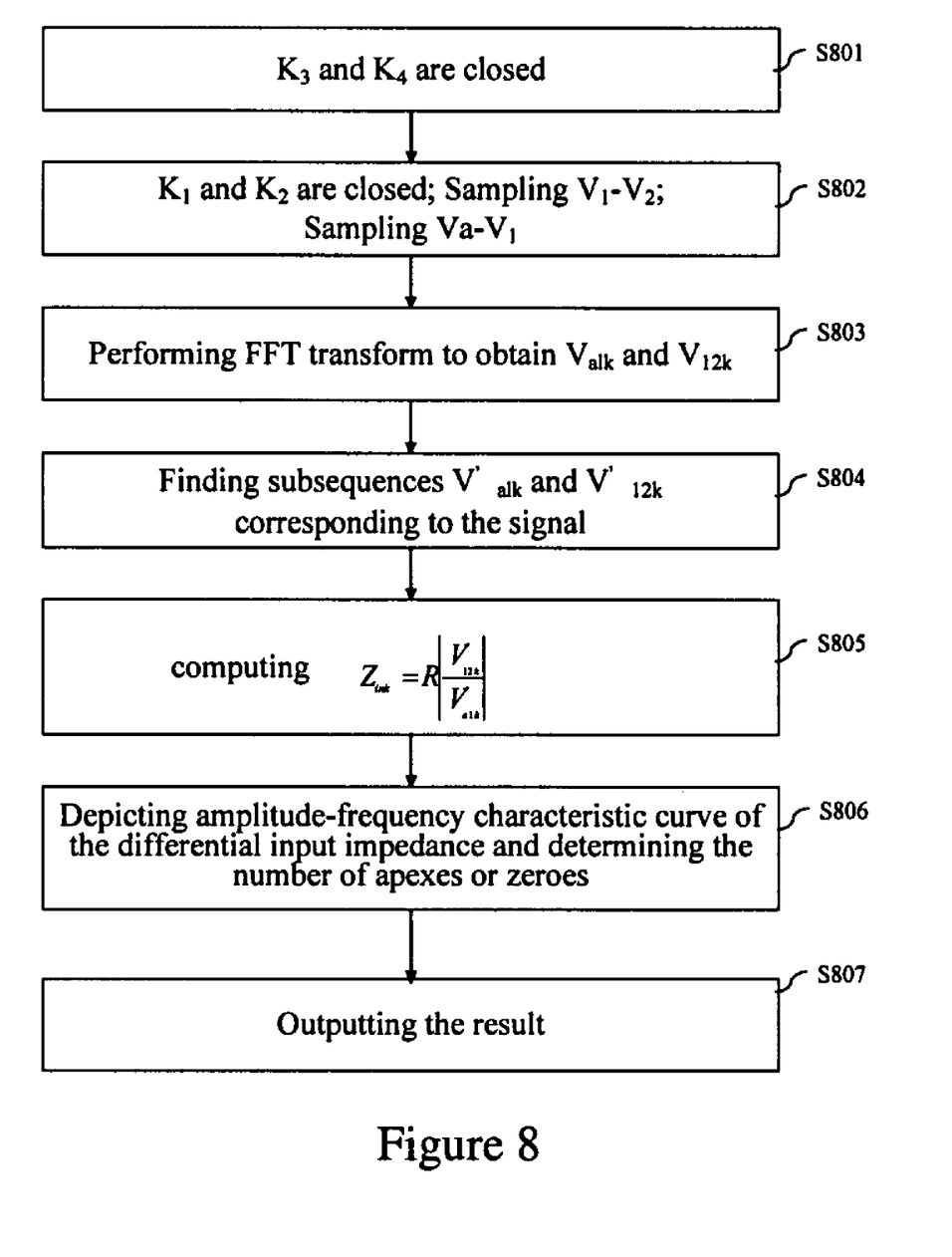
FIG. 8 is a flowchart of detecting inductive elements in the communication line in accordance with an embodiment of the present invention.

FIG. 8 illustrates the process of detecting inductive elements by device 100, which is described in detail as follows:

Step S801: The control unit 101 controls to close the relay switch $K_3$ and $K_4$, namely accessing to the communication line. The control unit 101, when detecting that the digital signal processor 102 is ready, will send a startup demand to the digital signal processor 102. Upon receiving the startup demand, the digital signal processor 102 will send a data sampling demand to the logical unit 107. The logical unit 107 initiates the digital/analog converter 1031 to generate the detecting signal. The digital/analog converter 1031 reads the digital detecting signal from the storage 1032, converts them into the analog detecting signal, and sends the analog detecting signal to the communication line via the line interface unit 106. To avoid that the peak value of the communication line's inherent resonance influences the detection, as mentioned above, the highest frequency of the detecting signal is not higher than the peak value of the communication line's inherent resonance.

Step S802: After the detecting signal is stable in the communication line, the control unit 101 controls to close the relay switches $K_1$ and $K_2$, and the logical unit 107 initiates the analog/digital converter 1042 to perform sampling, wherein the relay switches $K_1$ and $K_2$ comprise a relay switch group. The analog/digital converter 1042 samples two time domain voltage vectors $V_a-V_1$ and $V_1-V_2$ at the sampling nodes $V_a$, $V_1, V_2$, and the $V_a-V_1$ and $V_1-V_2$ are inputted into the operational amplifiers 1046 and 1047. After being amplified, the amplified voltage vectors are inputted to the linear filters 1044 and 1045, so as to perform an anti-aliasing filter process to filter the out-of-band signal. The analog/digital converter 1042 converts the filtered analog voltage signal into the digital signal which can be processed by the digital signal processor 102, and the digital signal will be stored in the storage 1043.

Step S803: The digital signal processor 102 retrieves the sampled data of the two time domain voltage vectors $V_a-V_1$ and $V_1-V_2$ from the storage 1043, and performs the FFT transform to the voltage vectors $V_a-V_1$ and $V_1-V_2$ to obtain the corresponding frequency domain voltage vector $V_{a1k}=V_a-V_1$ and $V_{12k}=V_1-V_2$.

Step S804: The digital signal processor 102 finds the subsequences of frequency, and calculates the vectors of these subsequences: $V'_{a1k}=V_a-V_1$ and $V'_{12k}=V_1-V_2$.

Step S805: The digital signal processor 102 calculates and obtains the sequence $$Z_{ink} = R\left|\frac{V'_{12k}}{V'_{a1k}}\right|.$$

Step S806: The digital signal processor 102 outputs the sequence $$Z_{ink} = R\left|\frac{V'_{12k}}{V'_{a1k}}\right|$$

by tracing so as to generate the amplitude-frequency characteristic curve of the differential input impedance of the communication line and determine the number of apexes or zeros on the amplitude-frequency characteristic curve of the differential input impedance which is the detecting result.

Step S807: The digital signal processor 102 reports the detecting result and other data to the control unit 101, and the control unit 101 outputs the detecting result and other data to the display unit 105 for displaying.

The foregoing is only the embodiments of the present invention and is not intended to limit the scope of the present invention. Any modification, equivalent substitution, or improvement made without departing from the spirit and principle of the present invention should be covered by the scope set forth in the appended claims.

The invention claimed is:

1. A method for detecting inductive elements in a communication line, comprising:
inputting a detecting signal to an end of the communication line;
sampling a time domain voltage vector of one end of the communication line;
generating an amplitude-frequency characteristic curve of a differential input impedance of one end of the communication line according to the time domain voltage vector, including
converting the time domain voltage vector into a frequency domain voltage vector, $V_{a1k}$, $V_{12k}$ (k=0, 1 ... N−2, N−1),
extracting a frequency subsequence vector, $V'_{a1k}$, $V'_{12k}$, corresponding to the detecting signal from the frequency domain voltage vector, wherein the relation between the frequency subsequence vector and the frequency domain voltage vector of the detecting signal satisfies a formula as follow:

$$\begin{cases} V'_{a1k} = V_{a1j}(k=0, 1 \ldots M-1; \quad j = \frac{f_k}{f_s}N) \\ V'_{12k} = V_{12j}(k=0, 1 \ldots M-1; \quad j = \frac{f_k}{f_s}N) \end{cases}$$

wherein, $V'_{a1k}$, $V'_{12k}$ are the frequency subsequence vectors, $V_{a1k}$, $V_{12k}$ are the frequency domain voltage vectors, $f_s$ is the sampling frequency for sampling the time domain voltage vector, N is the number of sampling points of the time domain voltage vector, M is the number of subsequences in the detecting signal, $f_k$ is the frequency value of each frequency component in the detecting signal,
computing a differential input impedance sequence of one end of the communication line according to the frequency domain voltage vector and the frequency subsequence vector, and
generating the amplitude-frequency characteristic curve of the differential input impedance corresponding to the differential input impedance sequence; and
determining the number of the inductive elements in the communication line according to the number of the apexes or zeros on the curve.

2. The method of claim 1, wherein the detecting signal is a sinusoidal modulated signal or a pulse signal.

3. The method of claim 1, wherein the highest frequency of the detecting signal is no more than a peak value frequency of an inherent resonance of the communication line.

4. The method of claim 1, wherein the amplitude-frequency characteristic curve of the differential input impedance of one end of the communication line is an amplitude-frequency characteristic curve of a transfer function of the differential input impedance of one end of the communication line.

5. The method of claim 1, wherein the amplitude-frequency characteristic curve of the differential input impedance of one end of the communication line is an amplitude-frequency characteristic curve of an imaginary part of the differential input impedance of one end of the communication line.

6. The method of claim 1, wherein the process of determining the number of the inductive elements in the communication line according to the number of the apexes or zeros on the curve comprises:
the number of the inductive elements in the communication line equals to the number of the apexes or the zeros on the curve.

7. A device for detecting inductive elements in a communication line, comprising:
a signal generating unit, for generating a detecting signal used for detecting the inductive elements in the communication line;
a line interface unit connected to the signal generating unit, for inputting the detecting signal into an end of the communication line;
a data sampling unit connected to the line interface unit, for sampling a time domain voltage vector of one end of the communication line;
a digital signal processor connected to the data sampling unit, for
generating an amplitude-frequency characteristic curve of a differential input impedance of one end of the communication line according to the time domain voltage vector, including,
converting the time domain voltage vector inputted by the data sampling unit into a frequency domain voltage vector, $V_{a1k}$, $V_{12k}$ (k=0, 1 ... N−2, N−1),
extracting a frequency subsequence vector, $V'_{a1k}$, $V'_{12k}$, corresponding to the detecting signal from the frequency domain voltage vector, wherein the relation between the frequency subsequence vector and the frequency domain voltage vector of the detecting signal satisfies a formula as follows:

$$\begin{cases} V'_{a1k} = V_{a1j}(k=0, 1 \ldots M-1; \quad j = \frac{f_k}{f_s}N) \\ V'_{12k} = V_{12j}(k=0, 1 \ldots M-1; \quad j = \frac{f_k}{f_s}N) \end{cases}$$

wherein, $V_{a1k}$, $V_{12k}$ are the frequency domain voltage vectors, $V'_{a1k}$, $V'_{12k}$ are the frequency subsequence vectors, $f_s$ is the sampling frequency for sampling the time domain voltage vector, N is the number of sampling points of the time domain voltage vector, M is the number of subsequences in the detecting signal, $f_k$ is the frequency value of each frequency component in the detecting signal,
computing a differential input impedance sequence according to the frequency domain voltage vector and frequency subsequence vector, and
generating the amplitude-frequency characteristic curve of the differential input impedance corresponding to the differential input impedance sequence; and determining the number of the inductive elements in the communication line according to the number of the apexes or zeros on the curve.

8. The device of claim 7, further comprising:
a control unit, for performing a centralized control to operations of the device, and receiving a detecting result outputted by the digital signal processor;
a logical unit, for receiving instructions sent by the control unit via the data signal processor, initiating the signal generating unit to generate the detecting signal, and initiating the data sampling unit to sample the time domain voltage vector of one end of the communication line.

9. The device of claim 8, further comprising:
a display unit connected to the control unit, for displaying the detecting result.

10. The device of claim 7, wherein the signal generating unit comprises:
a first storage, for storing the detecting signal; and
a first digital-to-analog signal converter connected to the first storage via the data bus, for reading the detecting signal, converting the detecting signal into an analog signal and outputting the analog signal.

11. The device of claim 7, wherein, the data sampling unit comprises:
a differential operation amplifier connected to the signal generating unit, for amplifying the time domain voltage vector and outputting the time domain voltage vector;
a linear filter connected to the differential operation amplifier, for performing the anti-aliasing filter process to the time domain voltage vector;
a second analog-to-digital signal converter connected to the linear filter, for converting the time domain voltage vector inputted by the linear filter into a digital time domain voltage vector;
a second storage connecting to the second analog-to-digital signal converter via a digital bus, a control bus and an address bus, for storing the digital time domain voltage vector.

12. The device of claim 11, further comprising:
a control unit, for performing a centralized control to operations of the device, and receiving a detecting result outputted by the digital signal processor;
wherein the data sampling unit further comprises:
a first relay switch group, controlled by the control unit to be in an opening state or a closing state, for enabling the second analog-to-digital converter to sample in the closing state, and disenabling the second analog-to-digital converter to sample in the opening state.

13. The device of claim 7, wherein the line interface unit comprises:
two current detecting resistances connected to the signal generating unit and data sampling unit respectively, for inputting the detecting signal outputted by the signal generating unit into one end of the communication line, and converting the time domain voltage vector into current and inputting the current to the data sampling unit.

14. The device of claim 13, further comprising:
a control unit, for performing a centralized control on the operation of the device, and receiving a detecting result outputted by the digital signal processor;
wherein the line interface unit comprises:
a second relay switch group, controlled by the control unit to be in an opening state or in a closing state, for connecting the device to one end of the communication line in the closing state, and disconnecting the device from one end of the communication line in the opening state.

15. The device of claim 14, wherein the line interface unit further comprises an interline capacitance in parallel with the second relay switch group.

16. The device of claim 7, wherein the detecting signal is a sinusoidal modulated signal or a pulse signal.

17. The device of claim 7, wherein the highest frequency of the detecting signal is no more than a peak value frequency of an inherent resonance of the communication line.

* * * * *